United States Patent
Ahrweiler et al.

(10) Patent No.: US 6,314,771 B1
(45) Date of Patent: *Nov. 13, 2001

(54) DEVICE FOR APPLYING A PATTERNING AGENT TO A LINE

(75) Inventors: Karl-Heinz Ahrweiler, Willich; Heinz Grüber, Tönisvorst; Alfred Keller, Willich; Walter Schumacher, Aachen, all of (DE)

(73) Assignee: Eduard Kusters Maschinenfabrik GmbH & Co. KG, Krefeld (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,277
(22) PCT Filed: Feb. 4, 1998
(86) PCT No.: PCT/DE98/00306
§ 371 Date: Oct. 22, 1999
§ 102(e) Date: Oct. 22, 1999
(87) PCT Pub. No.: WO98/36121
PCT Pub. Date: Aug. 20, 1998

(30) Foreign Application Priority Data

Feb. 12, 1997 (DE) .............................. 197 05 258

(51) Int. Cl.⁷ ........................................ D06B 1/08
(52) U.S. Cl. ............................................ 68/200
(58) Field of Search ............................ 68/200, 205 R

(56) References Cited

U.S. PATENT DOCUMENTS

| | | | |
|---|---|---|---|
| 2,558,260 | * | 6/1951 | Maky . |
| 5,165,261 | * | 11/1992 | Cho .................................. 68/205 R |

FOREIGN PATENT DOCUMENTS

| | | |
|---|---|---|
| 1 099 332 | 2/1961 | (DE) . |
| 2900712 | * 7/1980 | (DE) . |
| 3315770 | * 10/1984 | (DE) . |
| 35 06 393 | 8/1986 | (DE) . |
| 9218012 | * 8/1993 | (DE) . |
| 0193085 | * 9/1986 | (EP) . |
| 0 674 950 | 10/1995 | (EP) . |
| 2539204 | * 7/1984 | (FR) . |

* cited by examiner

Primary Examiner—Philip R. Coe
(74) Attorney, Agent, or Firm—Kenyon & Kenyon

(57) ABSTRACT

A device for applying a patterning liquid to a web, particularly to a carpet web, has an exit slit with a plurality of valves distributed over the width of the web and arranged ahead of it, which can all be activated independent of one another, and which each supply the patterning liquid to a specific width section of the application slit. The valves are located as close as possible to the exit location so that the segment from the closing location of the valves to the exit location is as short as possible.

13 Claims, 5 Drawing Sheets

DEVICE FOR APPLYING A PATTERNING AGENT TO A LINE

BACKGROUND OF THE INVENTION

The invention relates to a device for applying a patterning agent to a web advancing in its lengthwise direction, and particularly for applying a liquid dye to a carpet web.

A device for applying a patterning agent to a carpet is known from German Patent 33 15 770 C2, where the web runs below an application bar, with the pile facing up, and an application slit which is open to the bottom is formed in the bar. Opposite to the application slit, the web is supported by a resilient cushion which rests against the back of the carpet web. The patterning agent is a foam which is fed to the application slit at several locations distributed over the working width of the slit. The foam is fed to the individual locations via separate feed lines from a distributor. Upstream of the distributor, in the flow direction, there are valves through which foam from a first foam mixer is fed to the distributor during certain time periods, while foam from a second foam mixer is fed to it at different time periods.

The principle described in German Patent 33 15 770 C2, can be applied to carpet webs oriented with their pile facing down, traversing over an application slit that opens up to the top for applying a dye bath patterning agent.

If the patterning agent is changed when operating an arrangement according to the principle of German Patent 33 15 770 C2, for example if a transition is made from a first color to another color, an amount of first patterning agent still located in the lines between the switch-over valves and the distributor, between the switch-over valves and the exit slit, in the distributor, in the feed lines, and in the individual channels of the application bar is displaced by the new patterning agent. When this occurs, mixing of the two patterning agents occurs, so that on the web there is no defined border between the two colors, but rather a transition state in which mixed shades occur, resulting in scrap or in goods of lesser quality. The length of web segments with such lower quality can be on the order of a meter or more.

Developments in today's textile finishing technology are in the direction of shorter and shorter yardage, down to as little as several hundred meters length for the web. Scrap lengths of one or more meters are thus a marked loss when expensive carpeting is involved. Efforts are therefore being made to reduce the losses which occur in devices of the type described, when a transition to a different patterning agent occurs.

A further development of the current technology is described in German Patent 29 00 712 A1. That patent describes a web that is guided over a pressure table, and an application bar provided with the application slit that rests directly on the web. An electrically activated valve is provided for each individual feed line, directly in front of the exit slit.

The segment from the closing location of the valve to the outer opening of the outlet zone, i.e. to the contact location of the pattern agent with the web, therefore becomes short. The residual amount of patterning agent remaining in the segment is also small. In case of a change of the patterning agent, only the relatively small amount of patterning agent still remaining between the valve and the web is displaced by the new patterning agent, and only this amount can result in mixing.

The transition length on the web is significantly reduced as a result of this approach. In this patent, the distance to the exit location should be as small as can be implemented in technical terms. At the same time, supplying the patterning agent via a plurality of individual valves distributed over the width of the web results in a significant improvement of the uniformity of the application amount per surface unit, crosswise to the web. This occurs because there are no flow-related pressure drops, for example, towards the edges of the web.

An additional feature of the device described in this patent is that by dividing the flow supply among a plurality of individual valves, each of which has a section of the outlet zone assigned to it, it is possible to change the patterning agent not only on the whole web, such as over the entire width of the web, but also to change over narrower width regions at different times, as determined by the number of valves, so that various complex patterns can be obtained. Here again, the shortened transition from one patterning agent to the next is of great significance, because only in this way can be produced sharply defined rectangular patterns on the web. More specifically, the device includes a separate valve for each individual feed line, and the feed lines lead to the application slit as slanted bores, drilled through the slide shoe of the application bar.

SUMMARY OF THE INVENTION

The device according to the present invention reduces the design and production effort of applying a pattern to a web. According to the invention, the device for applying a patterning agent to a carpet web includes an application bar extending crosswise and parallel to the carpet web, a slide surface disposed on a first face of the application bar, adapted for contacting the carpet web, a slit-like outlet zone formed in the application bar, opening into the slide surface, and extending along a working width of the application bar, support means disposed opposite to the slit-like outlet zone, adapted for biasing the carpet web towards the slit-like outlet zone, a plurality of feed lines supplying the patterning agent to the slit-like outlet zone, and a plurality of valves disposed in the application bar, corresponding to the plurality of feed lines, adjacent to the slit-like outlet zone.

Each one of the plurality of valves further includes a cylindrical valve chamber, a valve body rotatable on an axis of rotation substantially perpendicular to the carpet web, an outlet channel formed in the valve body along the axis of rotation and opening into the slit-like outlet zone, an inlet channel fluidly connected to the outlet channel, a feed channel opening into the valve chamber, fluidly connected to the corresponding feed line, and at least one additional feed channel opening into the valve chamber and fluidly connected to a corresponding one of a plurality of additional feed lines supplying an additional patterning agent to the slit-like outlet zone. The valve body is rotatable to bring the inlet channel in fluid connection with one of the feed channel and the at least one additional feed channel.

According to the invention, the feed lines are directed into the slit-like outlet zone in the flow direction of the patterning agent, so that each one of the different types of patterning agent passing through the plurality of valves enters into the slit-like outlet zone in parallel with the other types of patterning agent, not sequentially. In this way, the tendency towards mixing in the adjacent regions during flow through the outlet zone is minimized, because only a small portion of the fluid connections downstream from the valves are shared by different types of patterning agents.

A valve body is arranged in each cylindrical valve chamber of the application bar, and can rotate along an axis of rotation. Each valve has at least two feed lines or channels providing patterning agents to it, which open from two opposite sides into the valve chamber, at the same axial position of the chamber. The feed channels can be selectively connected with the inlet formed in the valve body by rotating the valve body, so that the inlet and a desired feed channel are aligned.

The outlet channel also formed in the valve body and the section of the slit-like outlet zone corresponding to that outlet channel can therefore be optionally supplied with the one or the other patterning liquid simply by rotating the corresponding valve body. According to the invention, each valve serves for switching on and off at least two feed lines, so that the total number of valves required is cut in half, and the patterning agent reaches the outlet zone without having to travel through slanted bores.

In one possible embodiment, the patterning agents comprise patterning liquids, but patterning agents in foam form are not excluded. In the preferred embodiment, the pattern is produced by dyeing, particularly dyeing of a carpet web.

As used in this description, the term "outlet zone" includes all types of slit-like exit chambers which have a narrow cross-section open towards the web. The actual opening can be open over its entire expanse, thus forming an actual slit, or can have different exit configurations, such as one or more rows of holes, rows of slits, wire mesh, and other known configurations.

In one embodiment of the invention, the segment remaining between the closing location of the valve and the outer opening of the outlet zone can have, for example, a length of approximately less than about 12 cm, preferably not more than about 6 cm. According to one embodiment, the valve has at least three activation positions, in which the inlet can be connected with the one or the other feed channel, or can be in a closed position.

In an advantageous construction according to one embodiment, the valve has a spherical center part, in which the inlet is formed. This creates the possibility of supplying the inlet from one feed channel, while the other feed channel or the other feed channels are connected with the return line. The pumps assigned to all the feed channels can therefore continue to run, without any shut-off pressure changes, because the patterning agent in the feed line not reaching the web is recirculated or disposed of. In a preferred embodiment, the valves can each be activated individually, with separate drives.

The exit of the patterning agent can be made more uniform by using a perforated metal sheet, a slit metal sheet, a grid, or a similar covering provided with a plurality of exit openings located close to one another, which is arranged just ahead of the exit opening of the outlet zone. According to the invention, the exit part containing the intermediate channels and the outlet zone can be removed from the application bar along a plane perpendicular to the axis of the valve chambers, and forms the end of the valve chambers. This design facilitates access to the individual valves when maintenance or replacement is required. The outlet part can be covered by a removable shoe that forms the exit portion of the slide surface, to simplify accessibility of the outlet zone, and replacement of the glide surface.

The distance between the valves of an application bar in the lengthwise direction of the latter, crosswise to the web, is equivalent to the width of the region of the outlet zone supplied by a valve. This width, for example, can be of between about 20 and 60 mm. More preferably, the width can be of between about 25 and 50 mm. The precision of the division also determines the precision of the pattern on the web produced using the device.

In another embodiment of the device, several application bars with valves and outlet zones of the type described above are arranged one behind the other in the lengthwise direction of the web. The pattern variety can be increased by having the applications of the individual application bars supplement each other, or be superimposed on each other.

The device according to the invention can include a control mechanism by means of which all the valves placed on an application bar or on several application bars can be activated in controlled manner to produce a pattern. The control mechanism brings the valves into connection with the one or the other patterning liquid in each instance, or closes the valves, in accordance with a specific program, or if desired, in accordance with a random program.

It is to be understood that both the foregoing general description and the following detailed description are exemplary and explanatory and are intended to provide further explanation of the invention as claimed.

BRIEF DESCRIPTION OF THE DRAWINGS

The accompanying drawings show an exemplary embodiment of the invention, are included to provide a further understanding of the invention. They illustrate an embodiment of the invention and together with the description, serve to explain the objects, advantages, and principles of the invention. In the drawings.

DETAILED DESCRIPTION OF THE INVENTION

Figure 1:
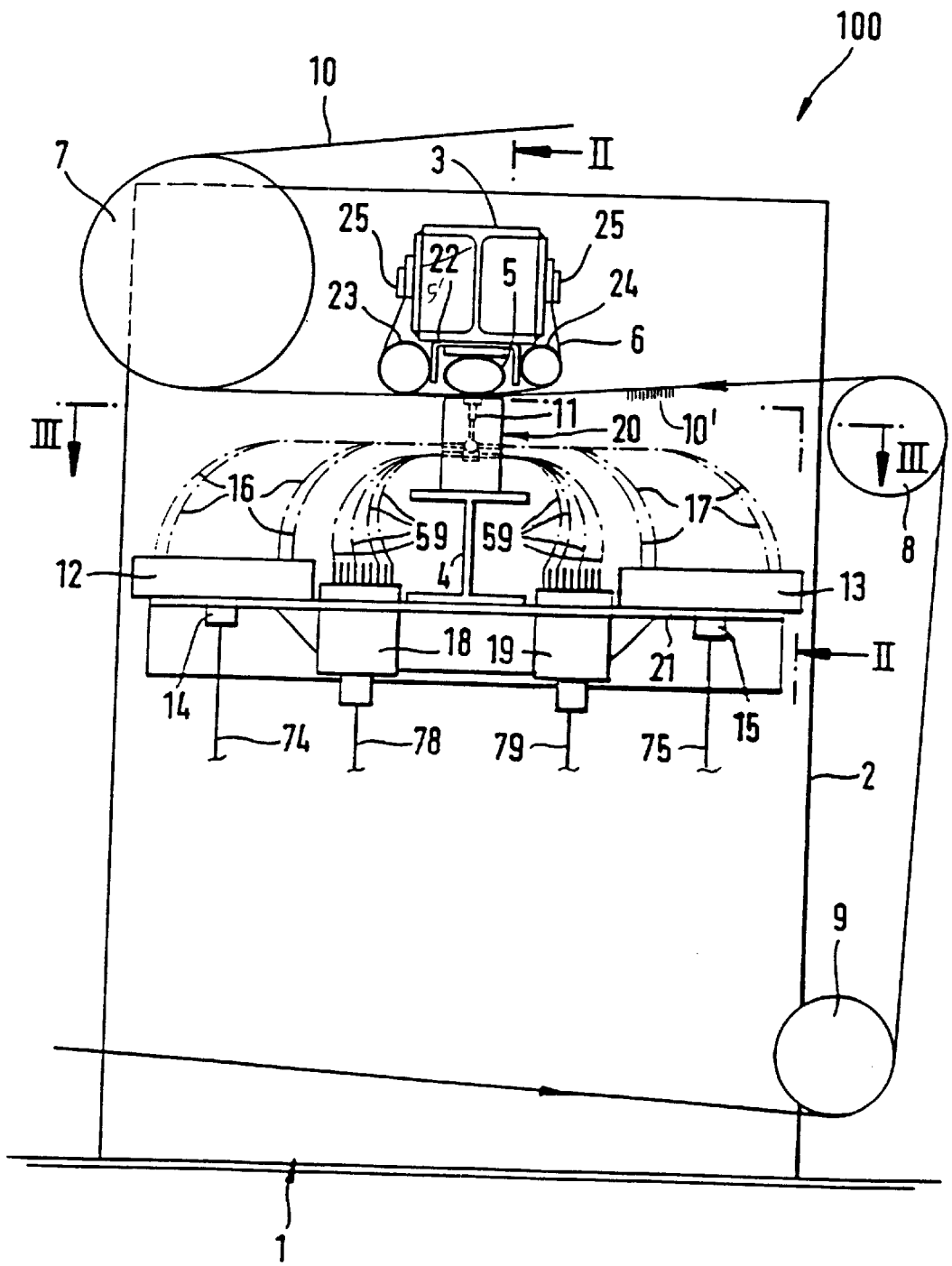
FIG. 1 is a side view showing a device according to the invention including the application bar.
Figure 2:
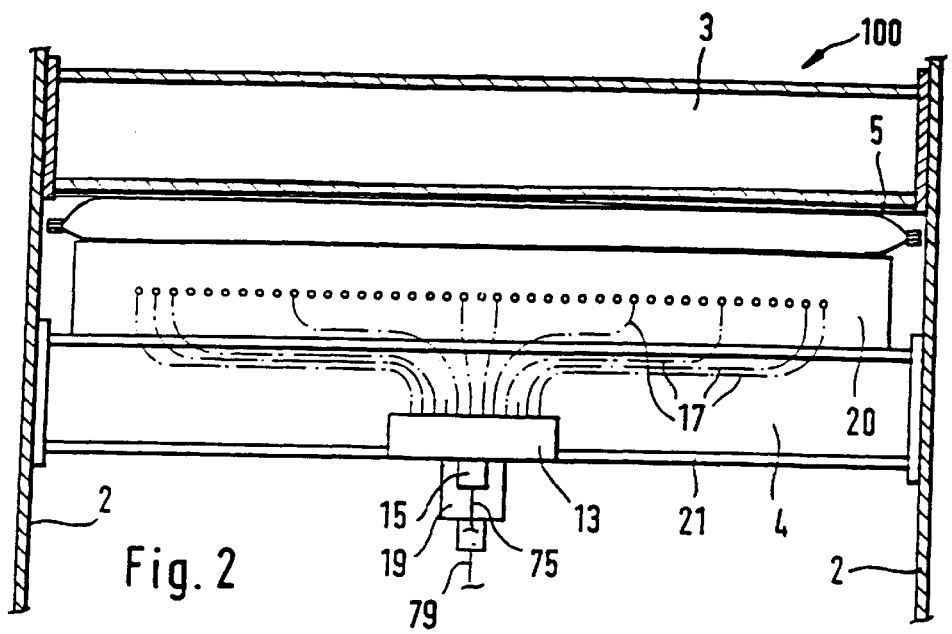
FIG. 2 is a cross sectional view on line II—II in FIG. 1.
Figure 3:
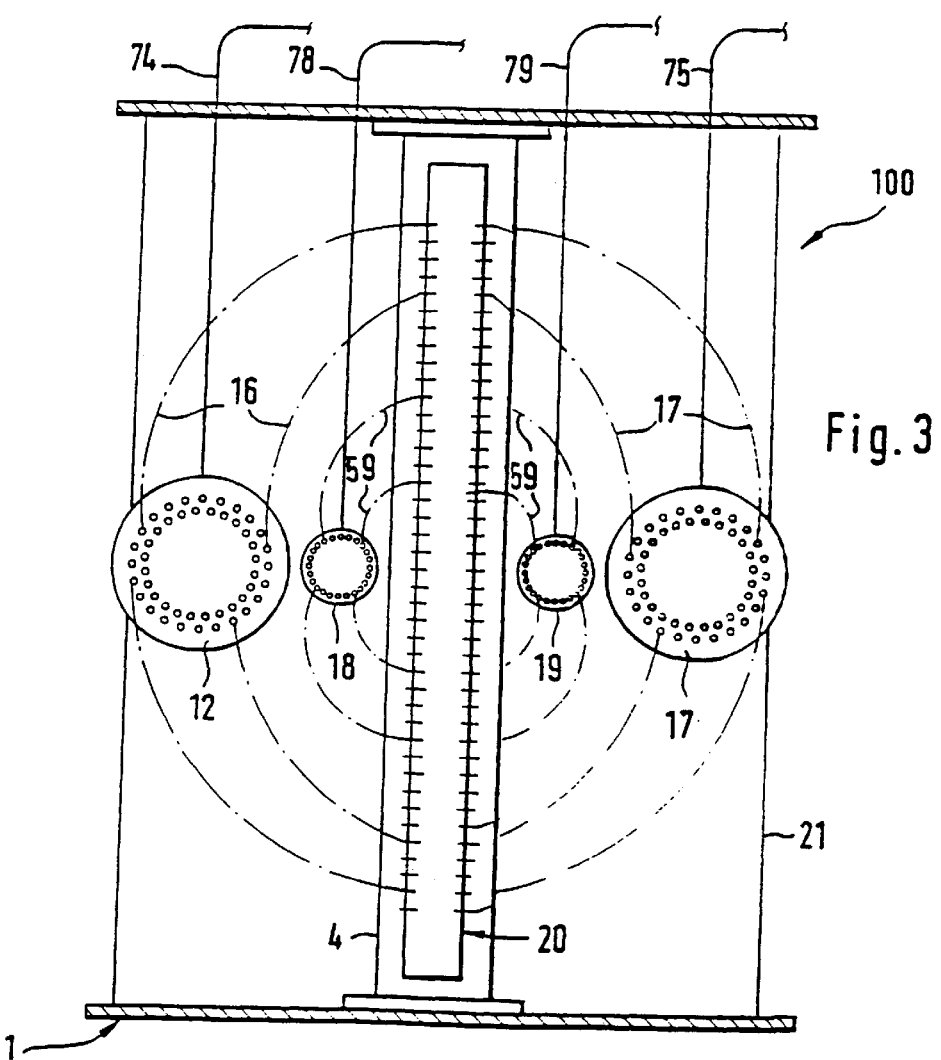
FIG. 3 is a cross sectional view on line III—III in FIG. 1.
Figure 4:
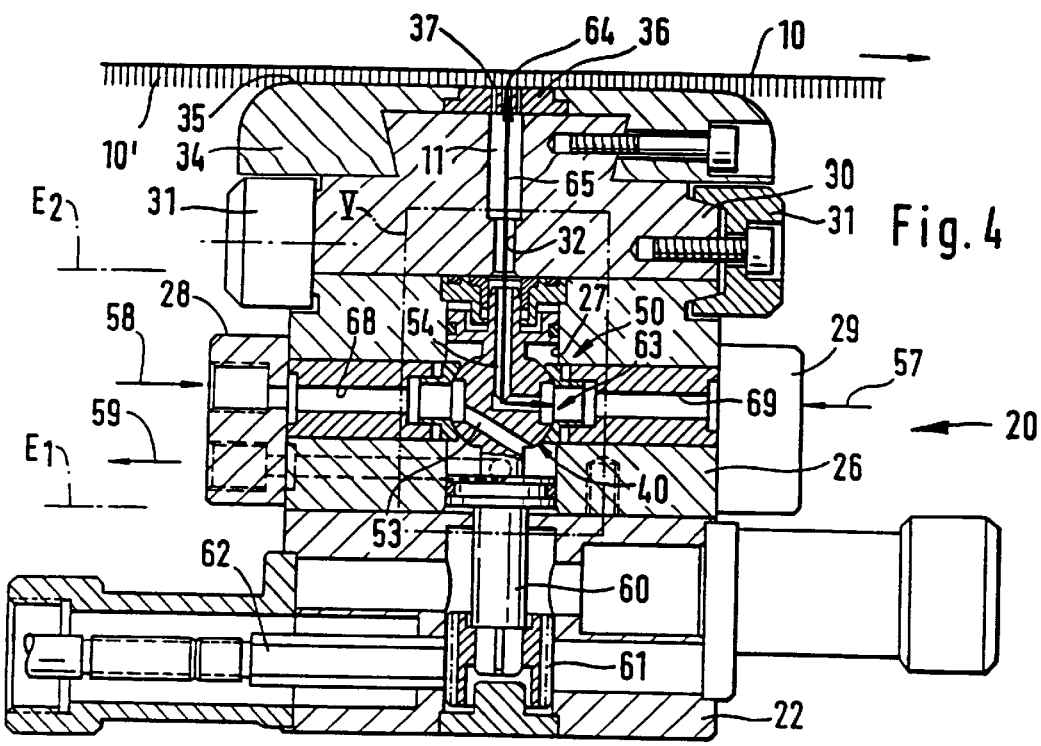
FIG. 4 is a cross-sectional view taken through the application bar.

The device for applying a patterning agent is indicated with reference numeral 100 in FIGS. 1, 3, and 4. It includes a machine frame 1 with two lateral, rectangular, upright frame plates 2 that stand opposite one another at a crosswise distance, and which are connected with one another by two cross-beams 3, 4 arranged one above the other in the upper region. Cross beams 3, 4 can be, for example, I-beams that are both arranged in the same vertical plane, perpendicular to frame plates 2, 2. Upper cross-beam 3 forms a support bar for an inflatable, hose-shaped pressure cushion 5 which is arranged below it and extends between frame plates 2, 2. A slide film 6 is stretched below cushion 5, and provides a rest for pressure cushion 5, as shown in FIGS. 1 and 3. Pressure cushion 5 is arranged between the shanks of a U-shaped profile 5' which is open to the bottom, leaving a space between the cushion 5 and the sides of profile 5'. Tubes 23, 24 which run parallel to pressure cushion 5 rest against the shanks from the outside. Tubes 23, 24 and U-profile 5' are wrapped together by slide film 6, which is fixed in place by its edges at 25, at the sides of cross-beam 3. In this way, vibrations of pressure cushion 5 and slide film 6 in the running direction of web 10 are avoided.

A first deflection roller 7 is arranged between frame plates 2, 2, in the vicinity of one vertical edge of machine frame 1, at the same horizontal level of cross-beam 3. Two additional deflection rollers 8, 9 which lie one above the other and below the first deflection roller 7, are arranged at the opposite vertical edge of machine frame 1. Deflection roller 8 has its top edge approximately at the level of the bottom of pressure cushion 5. Web 10 enters machine frame 1 near its bottom, is guided around deflection roller 9, to the top of the frame, around deflection roller 8, and then essentially horizontally, with the pile facing down, below slide film 6, around deflection roller 7, and then exits device 100 to the right, as shown in FIG. 1.

Cross-bar 4, which is arranged below and at a distance from cross-bar 3, serves as a support bar for application bar 20 which is arranged on it, and which extends between frame plates 2, 2, perpendicular to them, almost spanning the entire distance between them.

Application bar 20 is described in detail with reference to FIGS. 4 and 5. It includes an outlet zone 11, which is open to the top and extends crosswise over the width of web 10. A patterning agent, for example a liquid dye, exits upward from application bar 20 into pile 10' of web 10, as shown in FIG. 1. For example, web 10 can be a carpet web. The carpet web is indicated by the pile represented as 10'. Web 10 passes over outlet zone 11 with pile 10' facing down.

Web 10 moves along outlet zone 11 over the top of application bar 20, while a patterning agent is pressed into pile 10' of web 10. At the side opposite outlet zone 11, the back of web 10 slides along slide film 6, which is elastically supported by pressure cushion 5. The exit region of outlet zone 11 is therefore sealed by web 10 itself on one side, because web 10 is pressed against the edges of outlet zone 11.

In the embodiment shown in this example, two patterning agents are supplied to application bar 20 from corresponding distributors 12, 13, which are connected to corresponding supply containers 70, 71 at connections 14, 15, via lines 74, 75. The patterning agents are brought from containers 70, 71 under pressure, by pumps shown in FIG. 6. In distributors 12, 13, the patterning agents are divided among groups of lines 16 and 17, each containing a plurality of individual lines which supply the patterning agents to application bar 20 at locations distributed over the working width of the application bar 20. In the embodiment shown, each of the groups of lines 16, 17 only carries one type of patterning agent.

Figure 5:
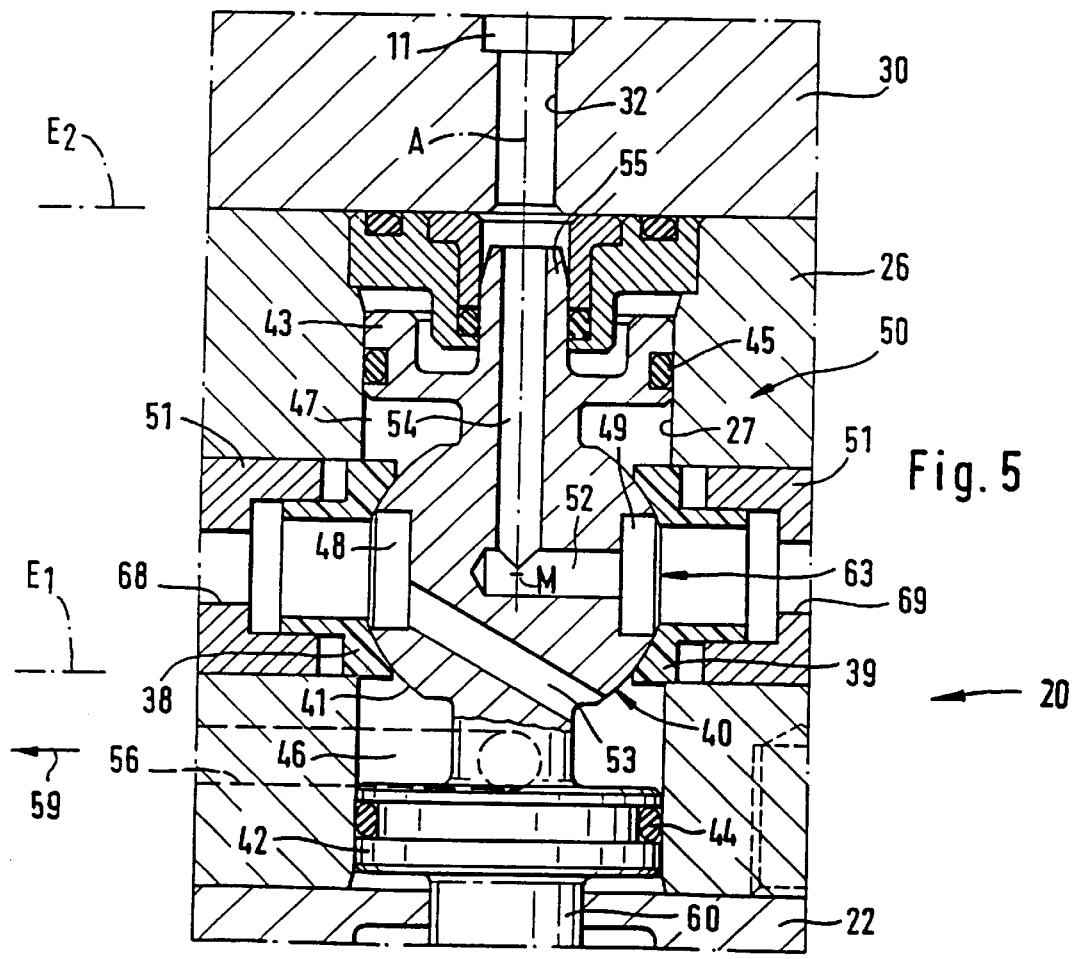
FIG. 5 shows an enlarged portion of the valve region V in FIG. 4.

Returns 59 shown in FIGS. 4 and 5 discharge in collector heads 18, 19. The patterning agent which was not applied to the web is returned from collector heads 18, 19 to supply containers 70, 71 via lines 78, 79. In an alternate embodiment, the unused patterning agent can be discharged into the sewer. The entire arrangement is housed on a horizontal cross-plate 21, below cross-beam 4.

As is shown in FIG. 4, application bar 20 has an essentially rectangular, upright cross-section. It has several parts which in turn also have a rectangular cross-section, which are arranged one above the other. Bottom part 22 is the drive part. Valve part 26 is attached to it, and includes a plurality of cylindrical valve chambers 27 lined up in rows perpendicular to web 10, crosswise to the working width, parallel to one another. The axes of rotation A of the valves all lie in the exit plane, which is the longitudinal center plane of application bar 20, and particularly of outlet zone 11, which is perpendicular to web 10.

Exit part 30 is attached to valve part 26 by clamps 31. Exit part 30 has an outlet zone 11 which extends over the working width of the application bar 20, and is open towards web 10. An intermediate channel 32 is formed by a bore at the location of each valve chamber 27, and is coaxial to it.

The top of exit part 30 is covered by a slide shoe 34, which forms a slide surface 35 on which web 10 slides along with pile 10'. Slide shoe 34 is divided in the manner shown in FIG. 4, and holds a perforated plate 36 in place in front of the opening of outlet zone 11. The plate 30 has a plurality of small passage bores 37 closely spaced together and uniformly distributed, through which the patterning agent located in outlet zone 11 can be uniformly applied to web 10.

In each valve chamber 27 there is a valve body 40 that can rotate within the chamber. Valve body 40 has a spherical center part 41 and, on both sides of it at a slight axial distance, a disk-shaped sealing ridge 42, 43, with a circumferential seal 44, 45 which forms a seal towards the inside circumference of valve chamber 27. The diameter of spherical center part 41 approximately corresponds to that of valve chamber 27. Ring spaces 46, 47 are formed between spherical center part 41 and sealing ridges 42, 43. These spaces are sealed axially towards the outside by sealing ridges 42, 43.

Valve body 40 has connecting ports 48, 49 on its spherical center part 41, which lie opposite one another. Sealing bushings 38, 39 which have a spherical sealing surface rest against the outer spherical surface of center part 41. Sealing bushings 38, 39 are arranged in sleeves 51, which are affixed on diametrically opposite sides of the spherical center part, in valve part 26. Feed channels 68, 69 are formed in sleeves 51. Sleeves 51 pass through valve part 26 all the way to the outside, and form the connection with connector pieces 28, 29, which are attached at the two opposite sides of valve part 26.

The embodiment described can be used where two patterning agents are supplied to each valve 50, via two feed channels 68, 69. This embodiment is the one most used in practice, but it would be possible, according to the invention, to have more than two patterning agents supplied to each valve 50.

From inlet location 49, shown in FIG. 5, an inlet passage 52 is formed radially with reference to the spherical center point M, and reaches the center of the spherical part. Inlet passage 52 continues into an outlet channel 54 which runs in the axial direction of valve body 40 and extends as a connector-type projection beyond the outer face of sealing ridge 43, aligned with intermediate channel 32 in exit part 30. In one embodiment, the diameter of intermediate channel 32 is slightly greater than that of exit channel 54.

A slanted channel 53 leads from opposite inlet location 48 into ring space 46, which lies opposite outlet channel 54 with reference to spherical center point M. This space, in turn, is connected with connector piece 28 and return 59 via a channel 56, shown with broken lines.

The operation of the device is described with reference to FIGS. 4 and 5. A first patterning agent is supplied to connector piece 29 from one of supply containers 70, 71, via one of distributors 12, 13, at a feed 57. The patterning agent is transferred to web 10 via feed channel 69, into sleeve 51, inlet 52, outlet channel 54, intermediate channel 32, and outlet zone 11. Pumps 72, 73 for both patterning agents run constantly. While the patterning agent is fed to web 10 via feed 57, the other patterning agent is circulated via feed 58. However, the other patterning agent does not reach web 10, but instead reaches ring space 46 via feed channel 68, inlet location 48, and slanted channel 53, and from there goes into return 59, via channel 56. In this manner, the patterning agent not applied to the web circulates in its ducting system, or is drawn off for disposal. Pumps 72, 73 can run continuously, without pressure surges in the patterning liquids due to switching patterning agents.

When it is desired to have the other patterning agent reach the web 10, valve body 40 is turned by 180° in valve chamber 27, so that inlet location 49 now is connected with feed 58, and the patterning agent supplied to feed 57 goes into return 59. In other, different embodiments, the rotation of valve body 40 can be of a different angular displacement, provided the desired feed channel is connected to the inlet 52.

The drive in this switching-rotation movement is provided by coaxial drive journal 60 arranged in the axis of valve body 40 and reaching into drive part 22. The journal carries a pinion 61 at its end, which pinion can be activated in any desired manner by a drive element 62, which engages from the side into drive part 22. According to the invention, the specific manner in which pinion 61 is rotated is not crucial, so any suitable drive can be used. For example, drive element 62 can have a rack-like structure and perform a longitudinal stroke. However, it is also possible that drive element 62 rotates and forms a worm-wheel drive with pinion 61.

According to the invention, it is preferred that the segment indicated in FIG. 4 by arrow 65, from closing location 63 of valve body 40 to exit location 64 of outlet 11 at web 10, be as short as can be practically designed. In the exemplary embodiment, this segment can have a length of approximately 6 cm. Size of segment 65 is determined by the size of valve body 40 and the size of exit part 30. In the latter, outlet zone 11 must have a certain cross-section and therefore a certain depth, to obtain pressure equalization and uniform distribution of the patterning agent, without any tendency toward crosswise flow.

Figure 6:
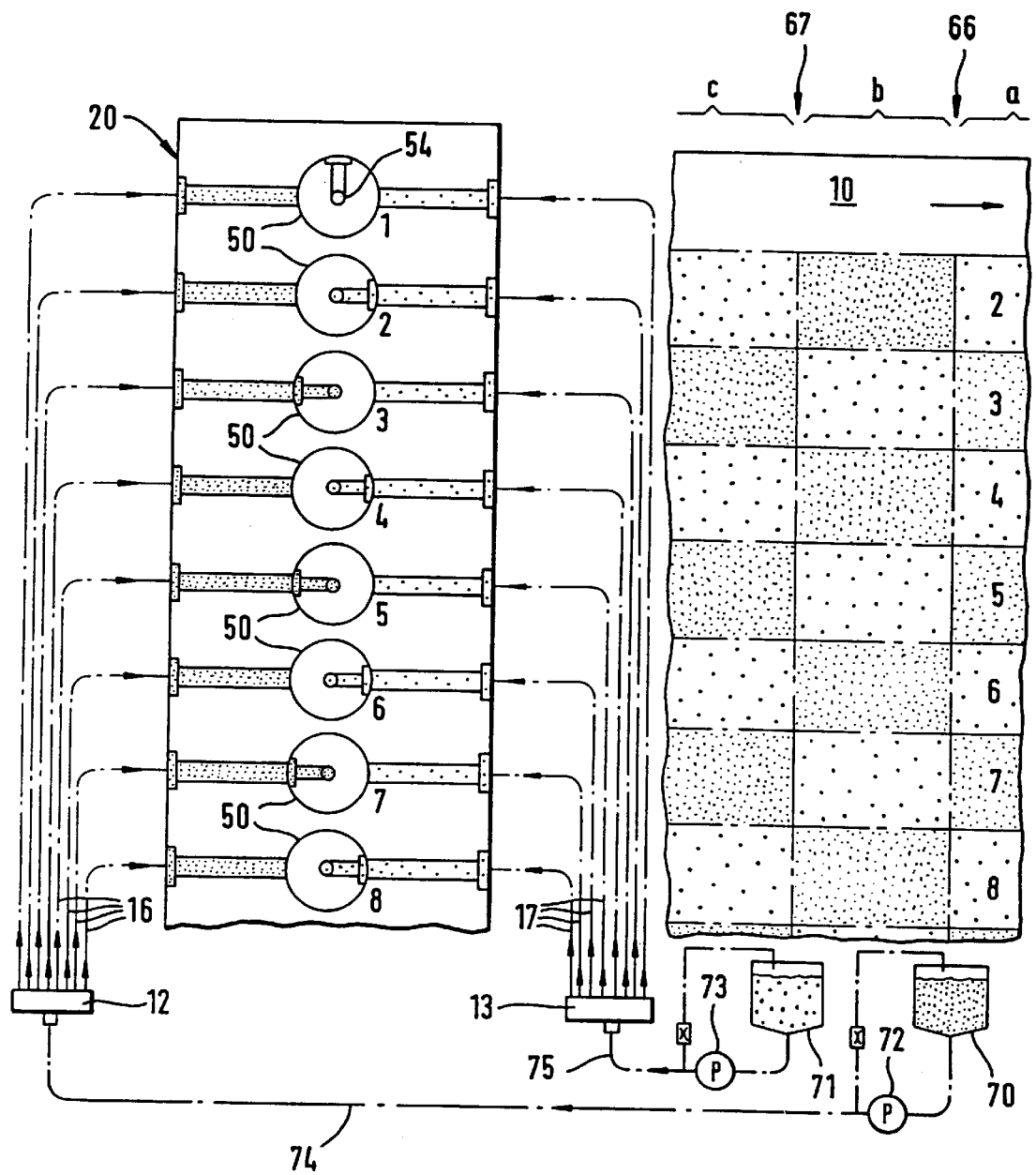
FIG. 6 is a diagram showing a schematic representation of the pattern being formed by a system according to the invention.

FIG. 6 shows an operational example of the system according to the invention in which a rectangular pattern is produced on web 10. The one end of application bar 20 with the first eight valves 50, numbered accordingly, is shown. Outermost valve I, shown at the top of FIG. 6, takes the 90° position, so that it is closed by turning inlet 52 away from both feed channels 68, 69. In this region, no patterning agent is applied to web 10, which is shown on the right side of FIG. 6. The reason for this is that the irregularly contoured edge of web 10 is supposed to remain free of patterning agent, and no patterning agent is supposed to exit outside of the edge of web 10.

In the left part of FIG. 6, the operation of the system is shown, corresponding to application of two types of patterning agents onto section "a" of web 10. As portion "a" of web 10 passes under application bar 20, valves II, IV, VI, and VIII receive patterning agent from distributor 13, and transfer it to web 10. This is indicated with widely spaced dots. Valves III, V, and VII, on the other hand, receive patterning agent from distributor 12, as shown by closely spaced dots.

When portion "b" of web 10 is under application bar 20, after location 66 goes by, valves II, IV, VI, and VIII, which were supplied from distributor 13 are switched to receive patterning agent from distributor 12, as indicated by the closely spaced dots. Valves III, V, and VII, which lie between them, are also switched and now receive patterning agent from distributor 13. When location 67 passes under application bar 20, another switch takes place, so that the distribution of the fields in section "c" is the same as in section "a". In one embodiment, all valves 50 can be individually activated, since valve bodies 40 can be rotated via drives 60, 61, 62 assigned to individual valves, independent of any other valves 50. In view of the plurality of valves, it is practical to control them using a suitable programmable electronic control unit.

When the system according to the invention is used to dye with a single color, all valves 50 receive the same patterning agent, which can be the same dye bath. The valves are not switched in single-color dyeing. Only if the web 7 is colored with a different color are all the valves switched over to a different dye bath, all at the same time.

Figure 7:
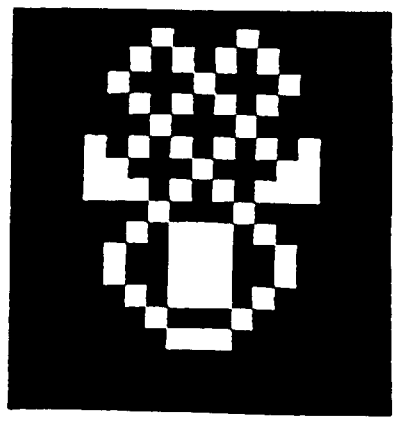
FIGS. 7, 8, and 9 are diagrams showing examples of patterns that can be produced by a system according to the invention.

Patterning does not have to take place in the regular, checker-board pattern shown in FIG. 6. By controlling valves 50 appropriately, individual patterns distributed over the surface of web 10 can be created. For example, as shown in FIG. 7, a more complex pattern can also be produced.

Figure 8:
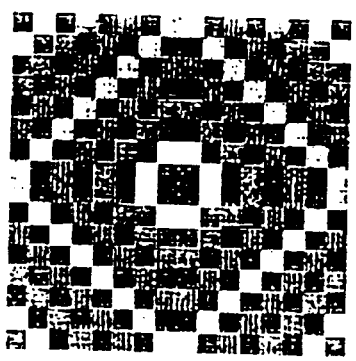
Figure 9:
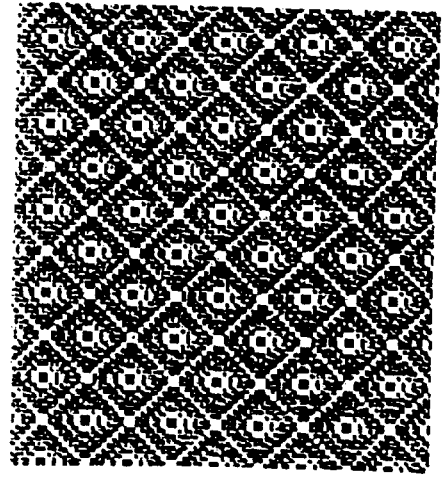

Device 100 can also include several application bars 20 arranged staggered one behind the other in the running direction of web 10, that give off patterning agent to the surface of web 10 one after the other. Using such an arrangement, more than two different patterning agents can be processed. It is understood that in this embodiment, the programmable electronic control mechanism must correctly sequence operation of the individual application bars 20. In this way, patterns such as that shown in FIG. 8 can be produced. Seen on a smaller scale, this pattern would have the appearance shown in FIG. 9, when applied to a carpet.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A device for applying a patterning agent to a carpet web, comprising:

an application bar extending crosswise and parallel to the carpet web;

a slide surface disposed on a first face of the application bar, adapted for contacting the carpet web;

a slit-like outlet zone formed in the application bar, opening into the slide surface, and extending along a working width of the application bar;

support means disposed opposite to the slit-like outlet zone, adapted for biasing the carpet web towards the slit-like outlet zone;

a plurality of feed lines supplying the patterning agent to the slit-like outlet zone; and a plurality of valves disposed in the application bar, corresponding to the plurality of feed lines, adjacent to the slit-like outlet zone;

each one of the plurality of valves further comprising:

a cylindrical valve chamber;

a valve body rotatable on an axis of rotation substantially perpendicular to the carpet web;

an outlet channel formed in the valve body along the axis of rotation, opening into the slit-like outlet zone;

an inlet channel, fluidly connected to the outlet channel;

a feed channel opening into the valve chamber, fluidly connected to the corresponding feed line; and at least one additional feed channel opening into the valve chamber, fluidly connected to a corresponding one of a plurality of additional feed lines supplying an additional patterning agent to the slit-like outlet zone;

wherein the valve body is rotatable to bring the inlet channel in fluid connection with one of the feed channel and the at least one additional feed channel.

2. The device according to claim 1, wherein a fluid connection between a patterning agent exit of the outlet channel and an outer opening of the slit-like outlet zone has a length of not more than approximately 12 cm.

3. The device according to claim 2, wherein the fluid connection has a length of not more than approximately 6 cm.

4. The device according to claim 1, wherein the valve body is rotatable between at least three positions, and the inlet channel is fluidly connectable in each of the at least three positions with one of the feed channel, the additional feed channel, and a closed position.

5. The device according to claim 1, wherein the valve body comprises:

a spherical center portion;

sealing ridges disposed at ends of the cylindrical valve chamber, at opposite axial ends of the valve body;

narrowing portions disposed between the spherical center portion and the sealing ridges of the valve body, cooperating with the cylindrical valve chamber to define a return chamber;

a return line connected to the return chamber; and first and second connecting ports arranged in a center plane perpendicular to the axis of rotation, the first connecting port being connected with the inlet channel, and the second connecting port being connected with a slanted channel formed in the spherical center part leading to the return chamber, wherein rotation of the valve body brings each of the first and second connecting ports in fluid connection with one of the feed channel and at least one additional feed channel.

6. The device according to claim 1, wherein each of the plurality of valves can be activated individually, with separate drives, and wherein the valve body of each valve comprises a drive journal for engaging the separate drives, disposed opposite to the outlet channel, coaxial to the axis of rotation.

7. The device according to claim 1, further comprising a coaxial cylindrical intermediate channel formed in the application bar, extending from and having at least the same diameter as the outlet channel of the valve body, opening into the slit-like outlet zone, continuous over the working width and having a uniform cross-section.

8. The device according to claim 7, wherein one of a perforated metal sheet, a slit metal sheet, and a grid is arranged on an exit opening of the slit-like outlet zone.

9. The device according to claim 8, wherein an exit portion of the application bar containing the intermediate channel and the slit-like outlet zone is removable from the application bar along a plane perpendicular to an elongation axis of the cylindrical valve chamber, and forms an end portion of the valve chamber.

10. The device according to claim 9, wherein the exit portion is covered by a removable shoe that forms the slide surface.

11. The device according to claim 1, wherein portions of the slit-like outlet zone supplied by each one of the plurality of valves have a width of approximately between 20 and 60 mm.

12. The device according to claim 1, further comprising additional application bars, additional valves disposed in each additional application bar, and additional slit-like outlet zones formed in each additional application bar, disposed one behind the other in a running direction of the carpet web.

13. The device according to claim 1, further comprising a programmable control device for selectively controlling the valves to produce a pattern on the carpet web.

* * * * *